(12) United States Patent
Tomescu et al.

(10) Patent No.: US 11,420,772 B2
(45) Date of Patent: Aug. 23, 2022

(54) SYSTEM AND METHOD FOR DETERMINING AN AXIAL POSITION OF A FEEDBACK DEVICE

(71) Applicant: PRATT & WHITNEY CANADA CORP., Longueuil (CA)

(72) Inventors: Dana Tomescu, Brampton (CA); James Jarvo, Saint-Bruno (CA); Ella Yakobov, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 425 days.

(21) Appl. No.: 16/717,321

(22) Filed: Dec. 17, 2019

(65) Prior Publication Data

US 2021/0179295 A1 Jun. 17, 2021

(51) Int. Cl.
*B64F 5/60* (2017.01)
*G01D 5/14* (2006.01)
*B64D 31/00* (2006.01)

(52) U.S. Cl.
CPC ............... *B64F 5/60* (2017.01); *B64D 31/00* (2013.01); *G01D 5/14* (2013.01)

(58) Field of Classification Search
CPC .. G01D 5/12–2525; B64C 11/301; B64F 5/60
See application file for complete search history.

(56) References Cited

U.S. PATENT DOCUMENTS

| | | | |
|---|---|---|---|
| 4,833,405 A | 5/1989 | Richards et al. | |
| 4,934,901 A | 6/1990 | Duchesneau | |
| 5,508,609 A | 4/1996 | Parkinson et al. | |
| 5,748,111 A | 5/1998 | Bates | |
| 5,897,293 A | 4/1999 | Arel et al. | |
| 5,913,659 A | 6/1999 | Doolin et al. | |
| 6,077,040 A | 6/2000 | Pruden et al. | |
| 6,782,766 B2 | 8/2004 | Parkinson | |
| 8,687,206 B2 | 4/2014 | Hockaday | |
| 8,692,543 B2 | 4/2014 | Exposito et al. | |
| 9,091,703 B2 | 7/2015 | Mulcaster | |

(Continued)

FOREIGN PATENT DOCUMENTS

| EP | 0353076 | 1/1990 |
|---|---|---|
| EP | 1876422 | 1/2008 |

*Primary Examiner* — Huy Q Phan
*Assistant Examiner* — David B Frederiksen
(74) *Attorney, Agent, or Firm* — Norton Rose Fulbright Canada LLP

(57) ABSTRACT

A sensor signal comprising a first signal pulse having a first voltage amplitude and a second signal pulse having a second voltage amplitude greater than or substantially equal to the first voltage amplitude is obtained from a sensor positioned adjacent a feedback device coupled to rotate with an aircraft-bladed rotor about a longitudinal axis and to move along the axis with adjustment of the rotor's blade pitch angle. The feedback device comprises a reference feature configured to generate the second signal pulse and varying detectable feature(s) configured to generate the first signal pulse and to cause a change in the first voltage amplitude as a function of an axial position of the feedback device along the axis. A voltage ratio is determined based on the first voltage amplitude and the second voltage amplitude, and the axial position of the feedback device is determined from the voltage ratio.

20 Claims, 10 Drawing Sheets

(56) References Cited

U.S. PATENT DOCUMENTS

| | | | |
|---|---|---|---|
| 9,821,901 B2 | 11/2017 | Duke et al. | |
| 10,392,962 B2 | 8/2019 | Rowe et al. | |
| 10,435,140 B2* | 10/2019 | Marone | B64C 11/301 |
| 2013/0094966 A1 | 4/2013 | Holt et al. | |
| 2014/0007591 A1 | 1/2014 | Khibnik et al. | |
| 2014/0064966 A1* | 3/2014 | Simpkins | G01J 1/0214 |
| | | | 416/61 |
| 2014/0226153 A1* | 8/2014 | Sun | B64C 27/008 |
| | | | 356/139.03 |
| 2018/0050789 A1 | 2/2018 | Marone et al. | |
| 2018/0050816 A1* | 2/2018 | Yakobov | B64C 11/30 |
| 2018/0304991 A1* | 10/2018 | Kudrna | G01D 5/147 |

* cited by examiner

SYSTEM AND METHOD FOR DETERMINING AN AXIAL POSITION OF A FEEDBACK DEVICE

TECHNICAL FIELD

The present disclosure relates generally to engines, and more specifically to determining the axial position of feedback devices used in engines.

BACKGROUND OF THE ART

Some feedback systems for featherable aircraft propellers use a feedback device that rotates with the engine to accurately measure the propeller blade pitch (or beta) angle and ensure that the blade angle is controlled according to the engine power set-point requested, such as in reverse and low pitch situations. A sensor can be used to measure the rotation of the feedback device via readable markers disposed on a surface of the feedback device, providing a proxy value for the rotational velocity of the engine, as well as to measure blade angle. Still, if the axial position of the feedback device is not accurately determined, the precision of the feedback system may be limited.

Therefore, improvements are needed.

SUMMARY

In accordance with a broad aspect, there is provided a method for determining an axial position of a feedback device, the feedback device coupled to rotate with an aircraft-bladed rotor about a longitudinal axis and to move along the axis with adjustment of a blade pitch angle of the rotor. The method comprises obtaining, from at least one sensor positioned adjacent the feedback device, a sensor signal comprising a first signal pulse having a first voltage amplitude and a second signal pulse having a second voltage amplitude greater than or substantially equal to the first voltage amplitude, the feedback device comprising at least one varying detectable feature configured to generate the first signal pulse and a reference feature configured to generate the second signal pulse, the at least one varying detectable feature configured to cause a change in the first voltage amplitude as a function of the axial position of the feedback device along the axis, determining a voltage ratio based on the first voltage amplitude and the second voltage amplitude, and determining the axial position of the feedback device from the voltage ratio.

In some embodiments, the second signal pulse is generated by the reference feature being configured to cause the second voltage amplitude to remain substantially constant regardless of the axial position of the feedback device.

In some embodiments, the method further comprises determining a difference between the second voltage amplitude and the first voltage amplitude, the voltage ratio determined based on the difference in voltage amplitude.

In some embodiments, the difference in voltage amplitude is determined as Vdelta=Vpk-pk2−Vpk-pk1, and the voltage ratio is determined as Vratio=Vdelta/Vpk-pk2=(Vpk-pk2−Vpk-pk1)/Vpk-pk2, where Vdelta is the difference in voltage amplitude, Vpk-pk2 is the second voltage amplitude, Vpk-pk1 is the first voltage amplitude, and Vratio is the voltage ratio.

In some embodiments, the difference in voltage amplitude is determined as Vdelta=Vpk-pk2−Vpk-pk1, and the voltage ratio is determined as Vratio=Vdelta/(Vpk-pk1+Vpk-pk2)=(Vpk-pk2−Vpk-pk1)/(Vpk-pk1+Vpk-pk2), where Vdelta is the difference in voltage amplitude, Vpk-pk2 is the second voltage amplitude, Vpk-pk1 is the first voltage amplitude, and Vratio is the voltage ratio.

In some embodiments, the first signal pulse is generated by the at least one varying detectable feature comprising at least one position marker having varying magnetic permeability.

In some embodiments, the first signal pulse is generated by the at least one varying detectable feature comprising at least one position marker having an axially varying dimension configured for causing the change in the first voltage amplitude as a function of the axial position of the feedback device.

In some embodiments, the first signal pulse is generated by the at least one varying detectable feature having a height smaller than a height of the reference feature for causing the second voltage amplitude to be greater than the first voltage amplitude.

In some embodiments, determining the axial position of the feedback device from the voltage ratio comprises inputting the voltage ratio into a look-up table and outputting the axial position from the look-up table.

In accordance with another broad aspect, there is provided a system for determining an axial position of a feedback device, the feedback device coupled to rotate with an aircraft-bladed rotor about a longitudinal axis and to move along the axis with adjustment of a blade pitch angle of the rotor. The system comprises at least one varying detectable feature and a reference feature provided on the feedback device, at least one sensor positioned adjacent the feedback device and configured for generating a sensor signal comprising a first signal pulse having a first voltage amplitude and a second signal pulse having a second voltage amplitude greater than or substantially equal to the first voltage amplitude, the first signal pulse generated upon the at least one sensor detecting passage of the at least one varying detectable feature as the feedback device rotates and moves about the axis and the second signal pulse generated upon the at least one sensor detecting passage of the reference feature as the feedback device rotates and moves about the axis, the at least one varying detectable feature configured to cause a change in the first voltage amplitude as a function of the axial position of the feedback device along the axis, and a measuring circuit coupled to the at least one sensor and configured for obtaining the sensor signal from the at least one sensor, determining a voltage ratio based on the first voltage amplitude and the second voltage amplitude, and determining the axial position of the feedback device from the voltage ratio.

In some embodiments, the reference feature is configured to cause the second voltage amplitude to remain substantially constant regardless of the axial position of the feedback device.

In some embodiments, the measuring circuit is further configured for determining a difference between the second voltage amplitude and the first voltage amplitude, and for determining the voltage ratio based on the difference in voltage amplitude.

In some embodiments, the measuring circuit is configured for determining the difference in voltage amplitude as Vdelta=Vpk-pk2−Vpk-pk1, and the measuring circuit is configured for determining the voltage ratio as Vratio=Vdelta/Vpk-pk2=(Vpk-pk2−Vpk-pk1)/Vpk-pk2, where Vdelta is the difference in voltage amplitude, Vpk-pk2 is the second voltage amplitude, Vpk-pk1 is the first voltage amplitude, and Vratio is the voltage ratio.

In some embodiments, the measuring circuit is configured for determining the difference in voltage amplitude as Vdelta=Vpk-pk2−Vpk-pk1, and the measuring circuit is configured for determining the voltage ratio as Vratio=Vdelta/(Vpk-pk1+Vpk-pk2)=(Vpk-pk2−Vpk-pk1)/(Vpk-pk1+Vpk-pk2), where Vdelta is the difference in voltage amplitude, Vpk-pk2 is the second voltage amplitude, Vpk-pk1 is the first voltage amplitude, and Vratio is the voltage ratio.

In some embodiments, the at least one varying detectable feature comprises at least one position marker having varying magnetic permeability.

In some embodiments, the at least one varying detectable feature comprises at least one position marker configured to vary axially across a top surface thereof for causing the change in the first voltage amplitude as a function of the axial position of the feedback device.

In some embodiments, the at least one varying detectable feature comprises at least one position marker configured to vary axially across at least one side surface thereof for causing the change in the first voltage amplitude as a function of the axial position of the feedback device.

In some embodiments, the at least one varying detectable feature and the reference feature are provided on a same position marker of the feedback device.

In some embodiments, the at least one varying detectable feature is provided on a first position marker of the feedback device and the reference feature is provided on a second position marker of the feedback device, the first and the second position marker circumferentially spaced about a surface of the feedback device.

In accordance with yet another broad aspect, there is provided a non-transitory computer readable medium having stored thereon program instructions executable by a processing unit for determining an axial position of a feedback device, the feedback device coupled to rotate with an aircraft-bladed rotor about a longitudinal axis and to move along the axis with adjustment of a blade pitch angle of the rotor. The program instructions are configured for obtaining, from at least one sensor positioned adjacent the feedback device, a sensor signal comprising a first signal pulse having a first voltage amplitude and a second signal pulse having a second voltage amplitude greater than or substantially equal to the first voltage amplitude, the feedback device comprising at least one varying detectable feature configured to generate the a first signal pulse and a reference feature configured to generate the second signal pulse, the at least one varying detectable feature configured to cause a change in the first voltage amplitude as a function of the axial position of the feedback device along the axis, determining a voltage ratio based on the first voltage amplitude and the second voltage amplitude and determining the axial position of the feedback device from the voltage ratio.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
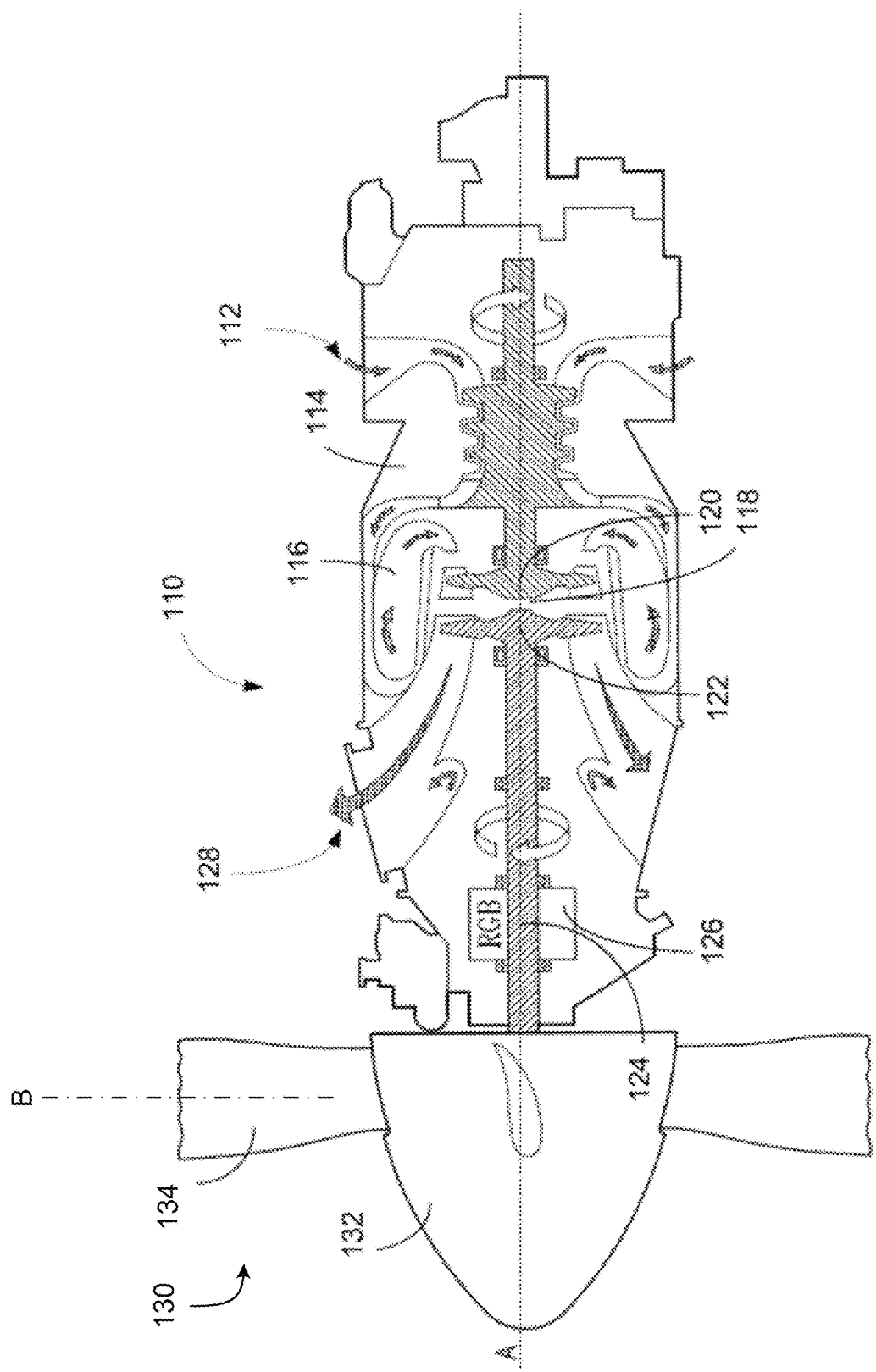
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades 134 connected to a hub by any suitable means and extending radially therefrom. The blades 134 are also each rotatable about their own radial axes through a plurality of blade angles, which can be changed to achieve modes of operation, such as feather, full reverse, and forward thrust.

Figure 2:
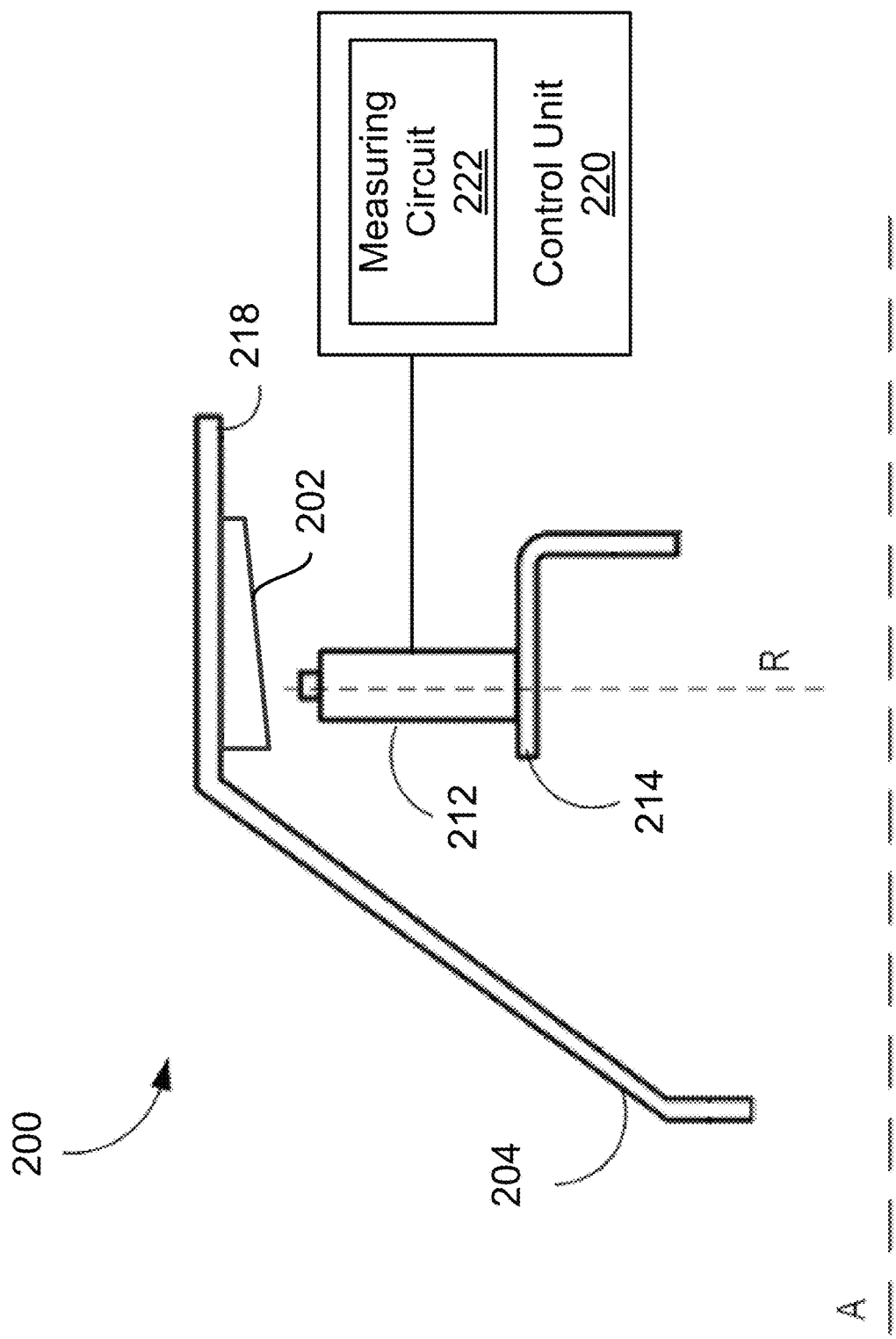
FIG. 2 is a schematic diagram of an example feedback sensing system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. As will be described further below, in one embodiment, the feedback device has multiple readable markers disposed on a surface thereof, and a sensor positioned adjacent the feedback device can be used to measure the rotation of the feedback device via the markers, providing a proxy value for the rotational velocity of the engine, as well as measure blade angle. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational velocity of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 212 positioned proximate the annular member 204. Annular member 204 (referred to herein as a feedback device) has a plurality of circumferentially-spaced apart and detectable features (also referred to as position markers) 202 disposed thereon for detection by sensor(s) 212. In some embodiments, the detectable features 202 and sensor(s) 212 may be disposed on a radially-outer side of feedback device 204. Alternatively, detectable features 202 and sensor(s) 212 could be disposed on a radially-inner side of feedback device 204. Several detectable features 202 may be spaced equiangularly about the perimeter (also referred to herein as the 'circumference') of the feedback device 204. Other embodiments may apply.

In one embodiment, the one or more sensors 212 are fixedly mounted to a static portion of the engine 110. In other embodiments, the one or more sensors 212 are mounted for rotation with propeller 130 and to move axially with adjustment of the blade angle of the blades of the propeller 130, and the feedback device 204 is fixedly mounted to a static portion of the engine 110.

In some embodiments, the feedback device 204 is mounted for rotation with propeller 130 and to move axially along rotation axis A to a plurality of axial positions, with adjustment of the blade angle of the blades of the propeller 130. An axial position of the feedback device 204 may then correspond to a respective angular (pitch) position of the blades and the position markers 202 may be useful for detecting the axial position of the feedback device 204 as the feedback device 204 and bladed rotor 130 rotate. The feedback device 204 may therefore be useful for detecting the angular position of the adjustable blades by way of correlation.

The system 200 also includes a control unit 220 communicatively coupled to the one or more sensors 212. The sensor(s) 212 are configured for producing a sensor signal which is transmitted to or otherwise received by the control unit 220, for example via a measuring circuit 222 thereof. The sensor signal can be an electrical signal, digital or analog, or any other suitable type of signal. In some embodiments, the sensor(s) 212 produce a signal pulse in response to detecting the presence of a position marker 202 in a sensing zone of the sensor 212. For example, the sensor 212 is an inductive sensor that operates on detecting changes in magnetic flux, and has a sensing zone which encompasses a circular or rectangular area or volume in front of the sensor 212. The position markers 202 provided on the feedback device 204 may then be made of any suitable material which would cause the passage of the position markers 202 near the sensor(s) 212 to provide a change in magnetic permeability within the magnetic field generated by the sensor 212. When a position marker 202 is present in the sensing zone, or passes through the sensing zone during rotation of the feedback device 204, the magnetic flux in the sensing zone is varied by the presence of the position marker 202 (in other words, a change in magnetic permeability occurs), and the sensor(s) 212 can produce a signal pulse, which forms part of the sensor signal. It should be understood that the sensor 212 may be any suitable sensor other than an inductive sensor, including, but not limited to, a Hall sensor and a variable reluctance sensor.

In the example illustrated in FIG. 2, a side view of a portion of feedback device 204 and sensor 212 is shown. The sensor 212 is mounted to a flange 214 of a housing (for example of the reduction gearbox 126), so as to be positioned adjacent the plurality of position markers 202, which may extend away from the feedback device 204 and towards the sensor 212. The sensor 212 may be mounted at any suitable angle relative to the position markers 202. In some embodiments, the sensor 212 is secured to the propeller 130 so as to extend away from the flange 214 and towards the position markers 202 along a radial direction, identified in FIG. 2 as direction 'IR'. Sensor 212 and flange 214 may be fixedly mounted, for example to the housing of the reduction gearbox 126, or to any other static element of the engine 110, as appropriate.

In some embodiments, a single sensor 212 is mounted in close proximity to the feedback device 204 and the position markers 202. In some other embodiments, in order to provide redundancy as well as multiple signal sources at different axial locations, one or more additional sensors, which may be similar to the sensor 212, are provided. In particular, it may be desirable to use multiple sensors when the axial distance (i.e. the distance along axis A) travelled by the feedback device 204 is too large for the range of the sensors 212. It should be understood that any suitable number of sensors 212 may apply and the number of sensors 212 and their positions may be optimized according to the specifics of the application.

Figure 3:
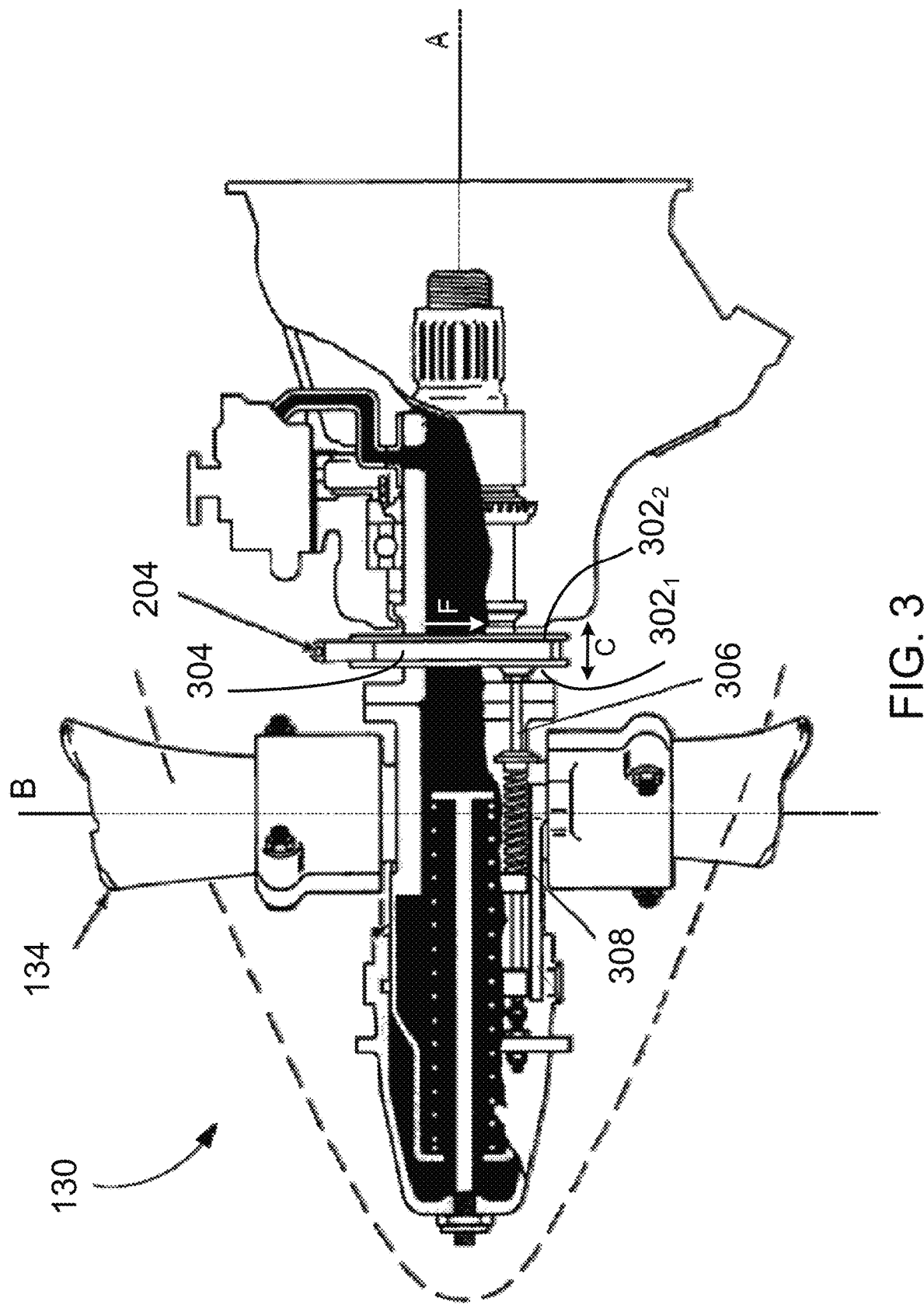
FIG. 3 is a schematic diagram of the propeller of FIG. 1 showing the feedback device of FIG. 2, in accordance with one embodiment.

With additional reference to FIG. 3, in some embodiments the feedback device 204 is embodied as a circular disk (or annular member) which rotates as part of the engine 110, for example with the propeller shaft 124 or with the propeller 130. The feedback device 204 comprises opposing faces (not shown) having outer edges $302_1$, $302_2$ and defines an exposed surface (also referred to as a "root surface") 304 which extends between the opposing faces and circumscribes them. Put differently, the surface 304 of the feedback device 204 is the periphery of the circular disk which spans between the two opposing faces and the root surface 304 intersects the faces at the edges $302_1$, $302_2$. The position markers 202 are illustratively provided on the surface 304 (in a manner that will be discussed in further detail below) and the sensor 212 is configured to be positioned adjacent the surface 304 to detect passage of the position markers 202. As discussed above, in some embodiments, the surface 304 is a radially-outer side of the feedback device 204 whereas in other embodiments, the surface 304 is a radially-inner side of feedback device 204.

The position markers 202 may be manufactured separately from the feedback device 204 and attached thereto using any suitable technique, such as welding or the like. A position marker 202 can then be a portion of the feedback device 204 which is made of a different material, or to which is applied a layer of a different material. The position markers 202 may then be applied to the surface 304, for instance as strips of metal or other material for detection by the sensor 212.

With continued additional reference to FIG. 3, the feedback device 204 is supported for rotation with the propeller 130, which rotates about the longitudinal axis A. The feedback device 204 is also supported for longitudinal sliding movement along the axis A (in the direction of arrow C), e.g. by support members, such as a series of circumferentially spaced feedback rods 306 that extend along the axis A. A compression spring 308 surrounds an end portion of each rod 306.

As depicted in FIG. 3, the propeller 130 comprises a plurality of angularly arranged blades 134, each of which is rotatable about a radially-extending axis 'IR' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full (or maximum) reverse mode is associated with negative blade angles.

Figure 4:
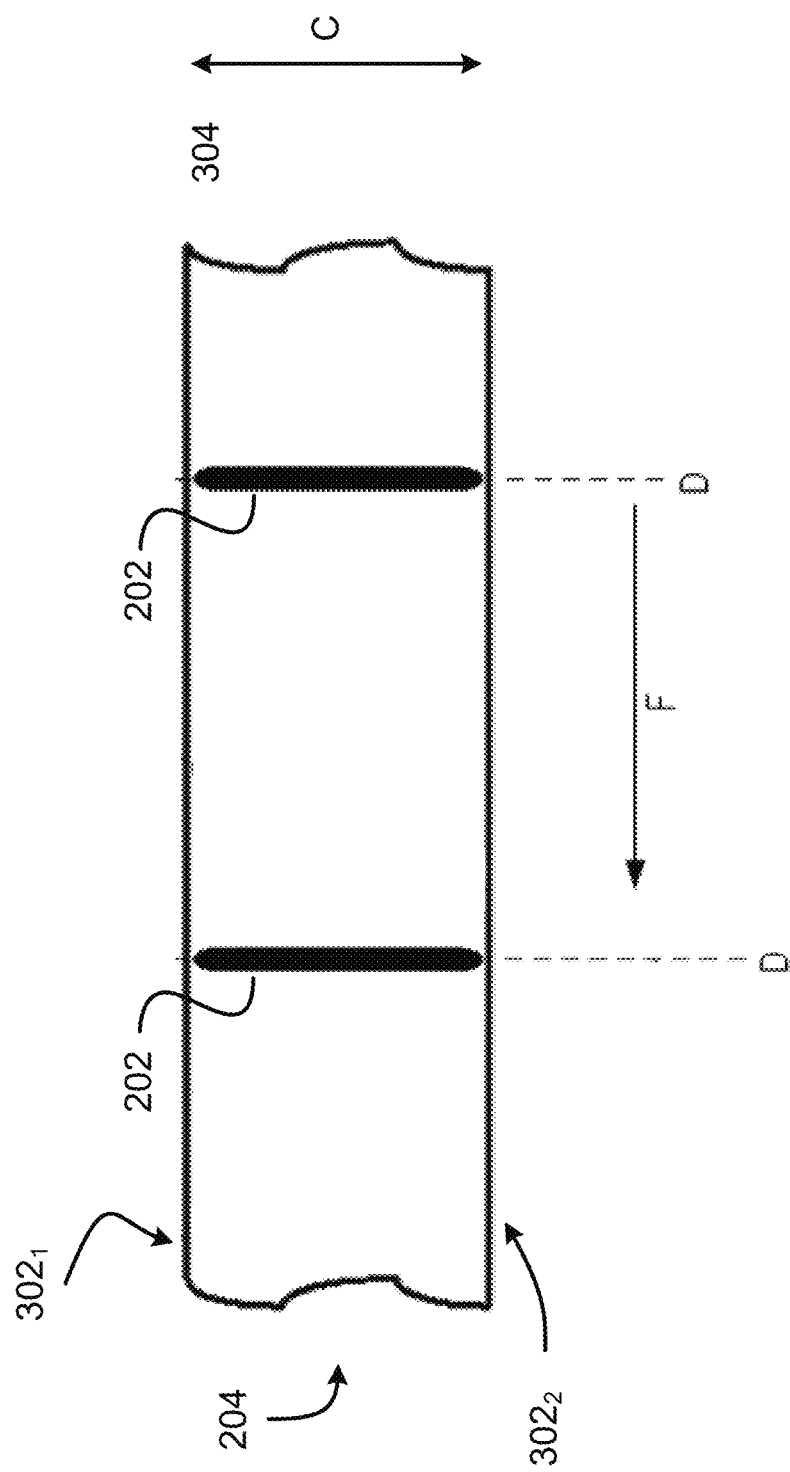
FIG. 4 is a schematic view of a surface of the feedback device of FIG. 2, with position markers provided thereon, in accordance with one embodiment.

Referring now to FIG. 4 in addition to FIG. 2 and FIG. 3, the feedback device 204 illustratively comprises position markers 202 (referred to herein as "straight" markers), which may, in one embodiment be arranged along a direction 'D' that is substantially transverse to the opposing edges $302_1$, $302_2$ (i.e. substantially parallel to the axis A of FIG. 3). Although only two markers 202 are illustrated, it should be understood that any suitable number of markers 202 may be present across the whole of the surface 304. In one embodiment, the markers 202 may be substantially equally spaced from one another on the surface 304. In addition, the markers 202 may, in some embodiments, be of substantially a common shape and size, for example having a common volumetric size. Still, other embodiments are considered.

The signal pulses produced by the sensor 212, which form part of the electrical signal received by the control unit 220, can be used to determine various operating parameters of the engine 110 and the propeller 130. In particular, the sensor signal generated by the sensor 212 illustratively comprises a series of pulses generated in response to detecting the markers 202. The spacing of the markers 202 (which may, or may not, be regular) can, for example, be used to determine a speed of rotation of the feedback device 204 and/or a blade angle of the propeller 130.

With continued reference to FIG. 2, FIG. 3, and FIG. 4, as the feedback device 204 rotates, varying portions thereof enter, pass through, and then exit the sensing zone of the one or more sensors 212. From the perspective of the sensor(s) 212, the feedback device 204 moves axially along axis A (in the direction of arrow C, referred to herein as the "axial direction") and rotates about direction 'F'. In particular, with axial travel of the feedback device 204, the one or more sensors 212 are positioned adjacent to different portions of the feedback device 204. The sensor 212 is adjacent the edge $302_2$ (also referred to as the 'engine side') when the propeller (reference 130 in FIG. 1) is in a fine (or lower) pitch position. When the propeller 130 is in the maximum reverse condition, the sensor 212 is adjacent the edge $302_1$ (also referred to as the 'propeller side'). The longitudinal (or beta) position (along axis A) of the feedback device 204 relative to the sensor 212 therefore varies with movement of the feedback ring 204.

In order to improve the accuracy of the feedback system 200, it is proposed herein to determine the axial position of the feedback device 204 based on voltage. In one embodiment, the systems and methods described herein may be used to accurately determine the axial position of the feedback device 204, and accordingly compute the corresponding blade angle for the propeller (reference 130 in FIG. 1) for use in controlling the propeller. For this purpose and as will be discussed further below, the feedback device 204 is configured to comprise a reference (or "index") feature, which generates a substantially constant (or equal) signal pulse as the feedback device translates along the axial direction, and at least one varying detectable feature, which causes a change in the voltage amplitude of the sensor signal (i.e. in the voltage amplitude of the signal pulses produced by the sensor 212) as a function of an axial position of the feedback device 204.

The reference feature may be provided as a position marker 202 having a substantially constant geometry, namely a substantially constant dimension (i.e. height) across the axial direction and a substantially constant dimension (i.e. width or thickness) across the direction substantially perpendicular to the axial direction, as will be discussed further below. A speed marker (not shown), e.g. an additional index feature specifically used for speed sensing, may alternatively be used as the reference feature. Still, it should be understood that, in order to have an equally-spaced and balanced feedback device 204, it may be desirable to use a position marker 202 as the reference feature.

In some embodiments, the varying detectable feature(s) are provided by varying the geometry of one or more position markers 202. The geometry may be varied across the axial direction (i.e. along the rotational axis A), such that a detectable change in the voltage amplitude of the sensor signal is obtained as the feedback device 204 moves axially along the axis A. In particular, the change in voltage amplitude is detected upon passage of the varying detectable feature(s) in the sensing zone of the sensor 212 and can then be correlated to the axial positon.

The geometry modification may consist in a gradual change (e.g., increase or decrease) in the height or shape of the given position marker 202, provided the geometry modification results in a detectable change in signal as the feedback device 204 (and accordingly the given position marker 202) moves axially. For example, a varying detectable feature may be achieved by providing a sloped surface on a given position marker 202. In the embodiment illustrated in FIG. 5, the reference feature $502_2$ comprises a position marker of substantially constant dimensions (i.e., height and width) along the axial direction (indicated as direction 'E' in FIG. 5) and the direction (not shown) substantially perpendicular thereto and the varying detectable feature $502_1$ is achieved by providing a slope on a top surface 504 of the position marker 202. The sloped top surface 504 then changes the voltage amplitude as the feedback device 204 (and accordingly the position marker 202) moves axially.

Figure 5:
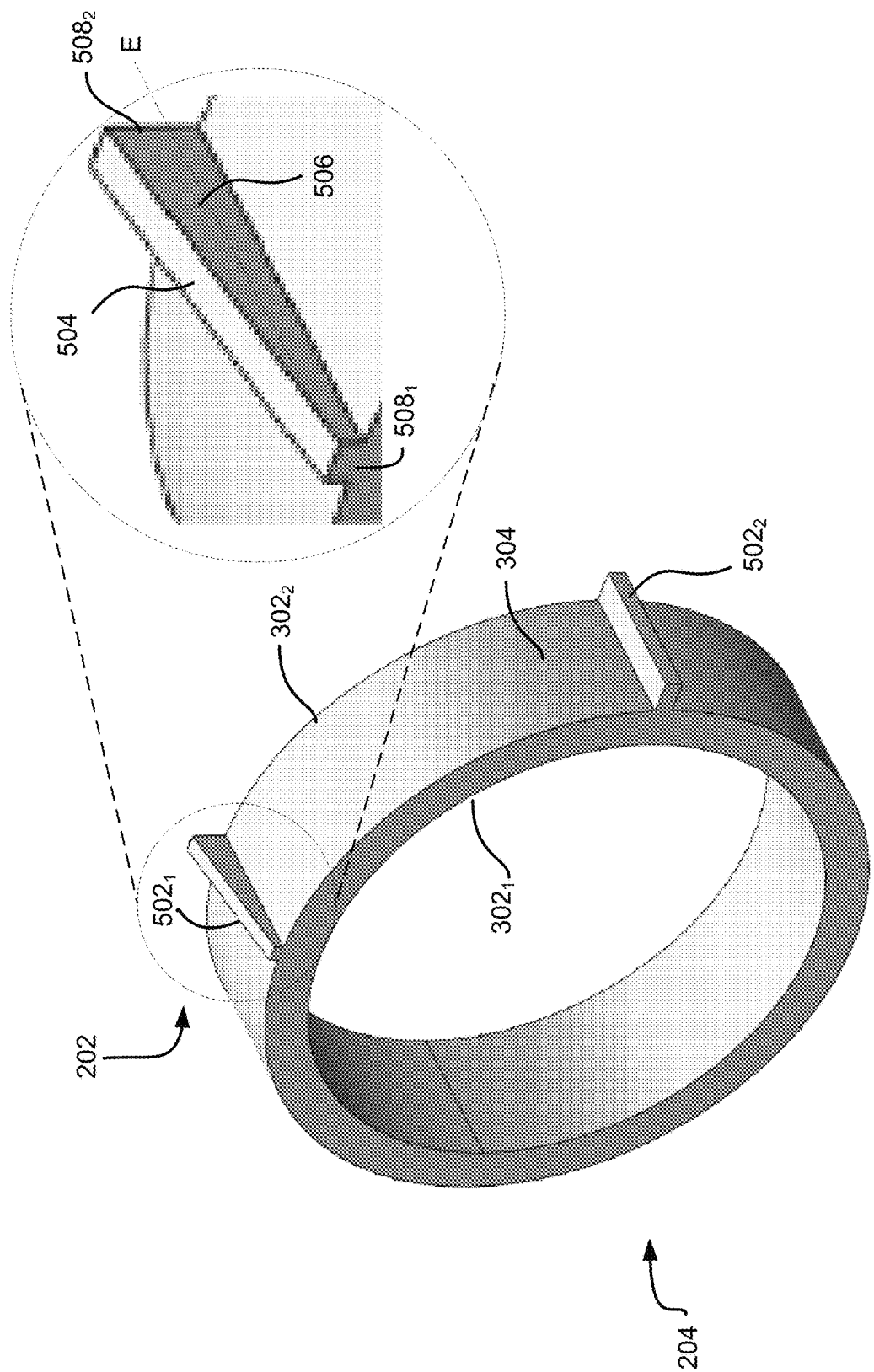
FIG. 5 is a schematic diagram of a feedback device having a varying detectable feature and a reference feature, in accordance with one embodiment.

FIG. 5 illustrates that the varying detectable feature $502_1$ is achieved by gradually increasing the height (i.e. the distance between the upper surface 504 and the root surface 304) of the position marker 202, from a first end $508_1$ thereof (provided adjacent the edge $302_1$) to a second end $508_2$ (provided adjacent the edge $302_2$) opposite the first end $508_1$. Thus, the varying detectable feature $502_1$ may be configured such that the height of the position marker 202 is the lowest when the propeller is in the reverse position and the highest when the propeller is in the low pitch condition. Although not illustrated, it should however be understood that the position marker's height may alternatively be reduced from the first end $508_1$ to the second end $508_2$, such that the position marker's height is the lowest in the fine pitch condition and the highest in the reverse condition. Still, because the reading error (also referred to as "beta error") that may be experienced by the feedback sensing system 200 is typically greater in the reverse condition, it may be desirable to ensure that the position marker's height is the lowest in the fine pitch condition and the highest in the reverse condition. This may in turn improve system accuracy. Indeed, when the position marker's height is the highest, the position marker 202 is positioned closer to the sensor 212, which improves the sensor signal.

It should also be understood the first and second ends $508_1$, $508_2$ of the varying detectable feature $502_1$ need not be provided adjacent the respective edge $302_1$, $302_2$ of the feedback device 204 but may extend beyond the edges $302_1$, $302_2$. Moreover, in some embodiments, the varying detectable feature $502_1$ may be achieved by providing a slope on one or more side surfaces 508 of the position marker 202 (e.g., in addition to or as an alternative to providing a slope on the upper surface 504). In addition, the slope of the position marker's surface (e.g., 504, 508) may be linear or non-linear. In some embodiments, the position marker's surface is sloped along a single direction, namely along the rotational axis A. In other embodiments, the surface is sloped along two or more directions, for example along the rotational axis A and along a direction substantially perpendicular to the rotational axis A. Other embodiments may also apply.

Figure 6:
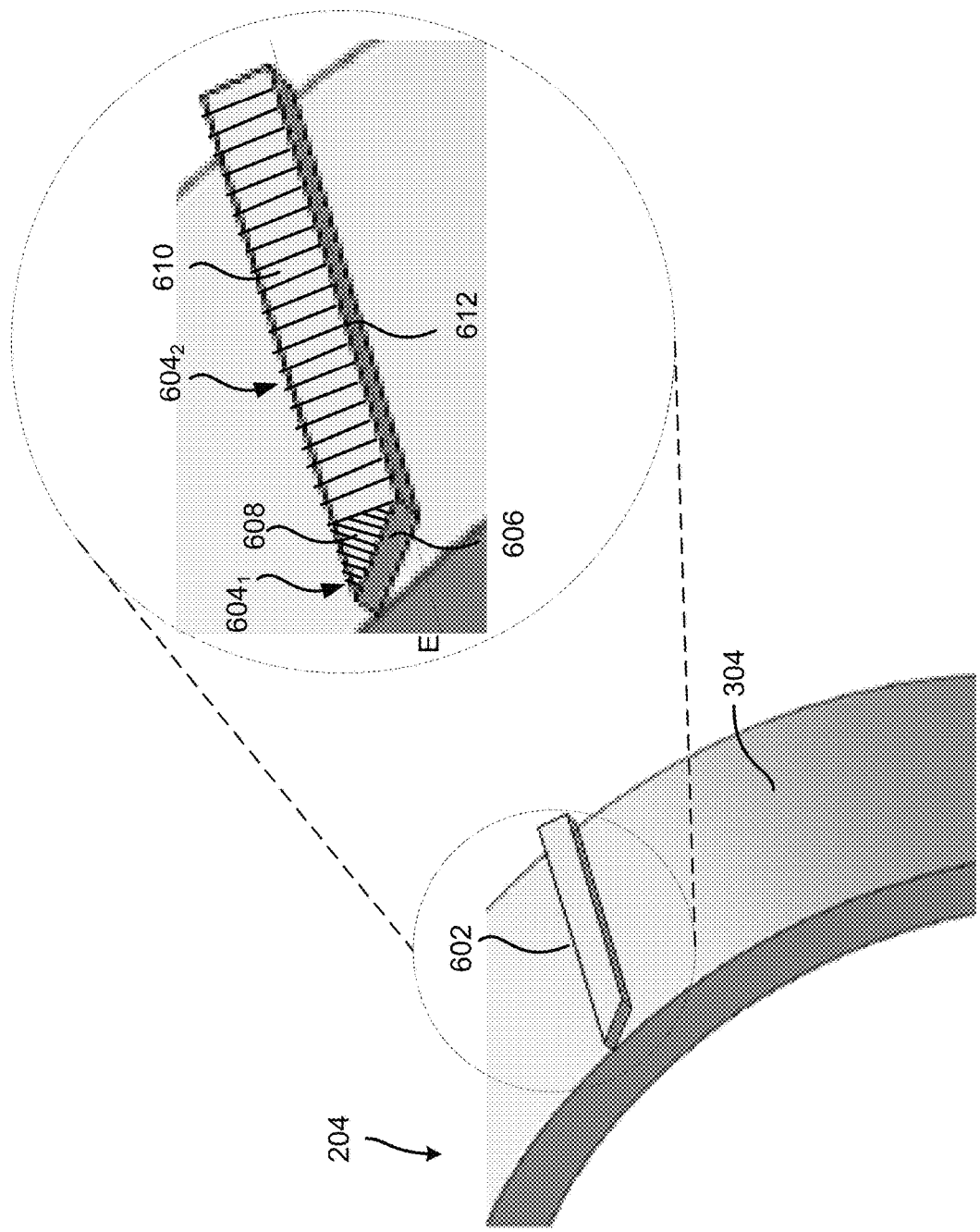
FIG. 6 is a schematic diagram of a feedback device having a varying detectable feature and a reference feature, in accordance with another embodiment.

As illustrated in FIG. 5, the varying detectable feature(s) as in $502_1$ and the reference feature as in $502_2$ may be provided on separate position markers as in 202 and circumferentially spaced about a surface of the feedback device 204 (i.e. provided at various radial positions). Alternatively and as illustrated in FIG. 6, a single position marker 602 may comprise both the varying detectable feature(s) and the reference feature. In particular, as shown in FIG. 6, the same position marker 602 may comprise a first section $604_1$, which has a varying geometry and constitutes the varying detectable feature, and a second section $604_2$, which is adjacent the first section $604_1$, has a substantially constant geometry, and constitutes the reference feature. The varying geometry of the first section $604_1$ may be achieved by providing the first section $604_1$ with a sloped surface 606. In the embodiment of FIG. 6, the sloped surface 606 is a side surface of the position marker 602. It should however be understood that both side surfaces of the position marker 602 may be sloped or chamfered. It should also be understood that the top surface 608 of the position marker 602 may alternatively (or additionally) be sloped. The substantially constant geometry of the second section $604_2$ may be achieved by providing the second section $604_2$ with dimensions (i.e., height and width) that remain substantially constant along the axial direction (indicated as direction 'E' in FIG. 6) and the direction (not shown) substantially perpendicular thereto. In other words, neither the top surface 610 nor the side surfaces 612 of the second section $604_2$ are sloped and the second section $604_2$ has a substantially cuboid shape.

It should also be understood that the change (e.g., increment) in the marker's dimensions (e.g., width) may be limited by the length (e.g., the dimension along the axial axis A) of the feedback device 204. It may also be desirable for the change in the marker's width to be such that, at no point along the axial direction, does the marker's width exceed the width (or thickness) of the head (not shown) of sensor 212. In this manner, accuracy of the feedback system 200 can be ensured.

Although the varying detectable feature(s) (as in $502_1$ in FIG. 5 or 602 in FIG. 6) are illustrated and described herein as having an axially varying slope, it should be understood that the varying detectable feature(s) as in $502_1$ may alternatively have an axially varying curve (not shown) and that the curve may be linear or non-linear. Other embodiments may apply.

Although FIG. 5 and FIG. 6 illustrate the varying detectable feature(s) as being achieved by varying the geometry of the position marker(s) as in 202, it should be understood that, in other embodiments, the varying detectable feature(s) may be achieved by varying the magnetic permeability of one or more position markers 202. Indeed, a position marker 202 of varying permeability along the rotational axis A will also cause the signal strength of the sensor 212 to vary as a function of axial position. As such, the position markers 202 may be configured such that their magnetic permeability gradually varies (e.g., gradually increases or decreases) along the direction of axial travel of the feedback device 204. This may be achieved by providing a feedback device 204 comprising two or more materials having different magnetic permeability. Other suitable geometric and/or material-based parameters of the position markers 202 may be used to induce the change in the voltage amplitude of the sensor signal as a function of axial position.

In addition, although a single varying detectable feature is described and illustrated in FIG. 5 and FIG. 6, it should be understood that any suitable number of varying detectable features may be provided on the feedback device 204, that the varying detectable feature(s) may be provided on straight markers, and that the varying detectable features may have any suitable configuration, shape, size, and orientation. In one embodiment, all position markers 202 may be configured to have varying detectable features. It should however be understood that, in other embodiments, only selected position markers 202 may have varying detectable features. It should also be understood that the number of varying detectable features that are provided on the feedback device 204 may depend on factors including, but not limited to, engine and/or feedback device configuration and required accuracy for the feedback sensing system 200. Indeed, providing an increased number of varying detectable features may allow to increase the resolution (i.e. increase the number of signal pulses per revolution of the feedback device 204), and accordingly improve accuracy of the axial position measurement. The number of varying detectable features and of reference feature(s) may therefore be optimized for the rotational speed of the feedback device 204.

Figure 7A:
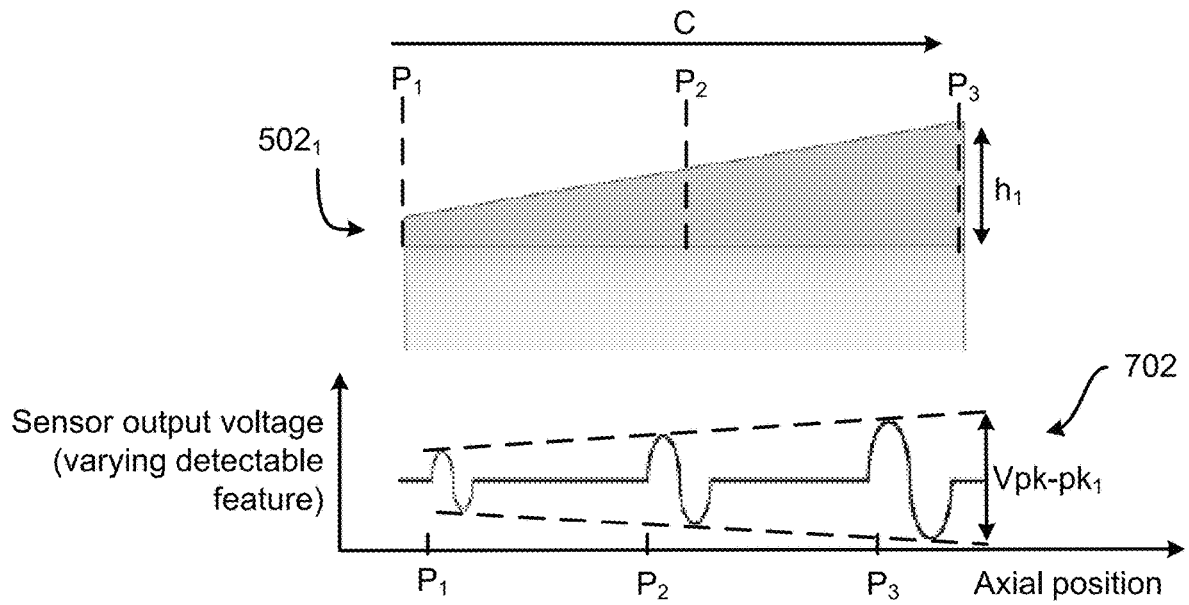
FIG. 7A is a plot of sensor output voltage as a function of an axial position of the feedback device of FIG. 5, upon detection of the varying detectable feature.
Figure 7B:
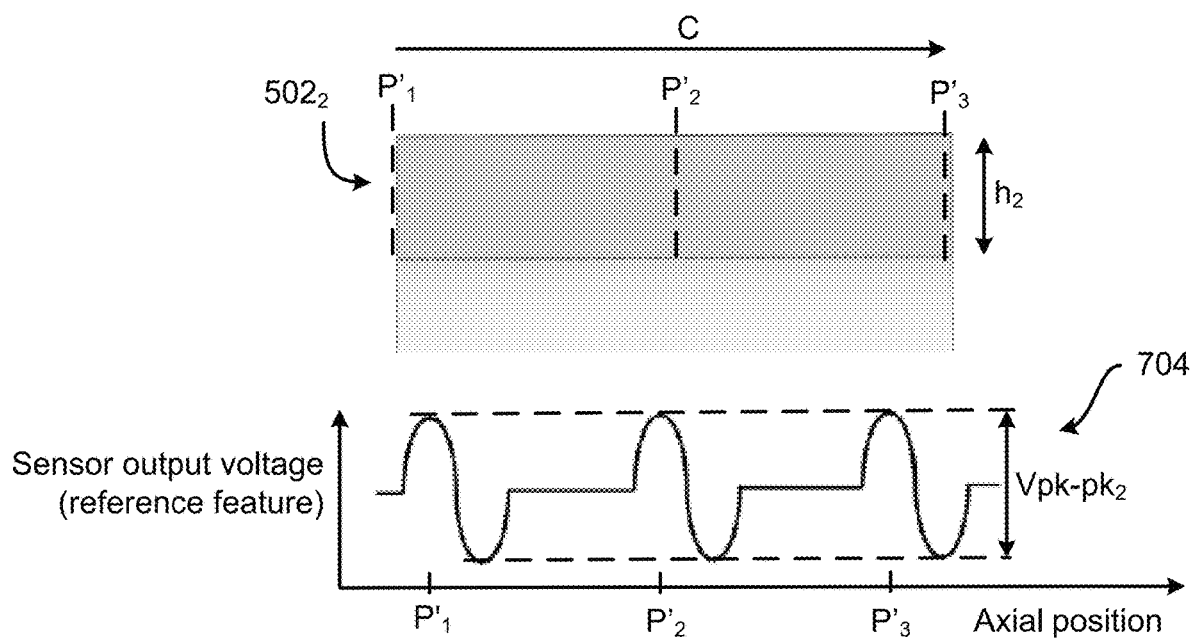
FIG. 7B is a plot of sensor output voltage as a function of an axial position of the feedback device of FIG. 5, upon detection of the reference feature.

Referring now to FIG. 7A and FIG. 7B, as described herein, the feedback device 204 is designed such that the geometry of the varying detectable feature(s) that pass the sensor (reference 212) in FIG. 2 in the axial direction produce a change in the voltage amplitude of the sensor signal pulses. In the embodiments of FIG. 7A and FIG. 7B, the voltage amplitude of the sensor signal pulses is represented as a peak-to-peak voltage amplitude (e.g., $V_{pk-pk}$). It should however be understood that the voltage amplitude may be represented as an average voltage amplitude, a root mean square (RMS) voltage amplitude (e.g., $V_{rms}$), or a peak voltage amplitude. Still, it may be desirable to use the peak-to-peak voltage amplitude (rather than the average, RMS, or peak voltage amplitude) because such a measure may provide a larger difference in voltage amplitude ($V_{delta}$, discussed further below), which may in turn improve system accuracy.

In the embodiment of FIG. 7A and FIG. 7B, the varying detectable feature $502_1$ extends axially (e.g., along the direction of axis A, as illustrated in FIG. 5), from a first end (illustrated as $P_1$) to a second end (illustrated as $P_3$), and has a gradually increasing height along the axial direction, from $P_1$ to $P_3$, reaching the highest point $h_1$. As discussed above, P1 may correspond to the reverse condition and P3 to the fine pitch condition. The changing geometry (e.g. slope) of the varying detectable feature $502_1$ causes the peak-to-peak voltage amplitude $V_{pk-pk1}$ of the signal pulse generated by passage of the varying detectable feature $502_1$ in the sensing zone of the sensor 212 to increase, from $P_1$ to $P_3$, as the feedback device 204 moves axially (in the direction of arrow C). In particular, the peak-to-peak voltage amplitude $V_{pk-pk1}$ is smallest (or minimum) at $P_1$ and largest (or maximum) at $P_3$, and in between its minimum and maximum values at $P_2$. In FIG. 7A, $P_2$ is illustrated as being substantially mid-point between $P_1$ and $P_3$. It should however be understood that the increase in voltage amplitude may not be linear and the voltage amplitude may not be mid-way between the minimum and maximum values at $P_2$.

Conversely, the reference feature $502_2$, which also extends axially (e.g., along the direction of axis A, as illustrated in FIG. 5) from a first end (illustrated as $P'_1$ in FIG. 7B) to a second end (illustrated as $P'_3$ in FIG. 7B) and has a substantially constant height $h_2$ along the axial direction, i.e. from $P'_1$ to $P'_2$ (substantially mid-point between $P'_1$ and $P'_3$) and $P'_3$. The substantially constant geometry of the reference feature $502_2$ causes the peak-to-peak voltage amplitude $V_{pk-pk2}$ of the signal pulse generated by passage of the reference feature $502_2$ in the sensing zone of the sensor 212 to remain substantially constant, from $P'_1$ to $P'_3$, as the feedback device 204 moves axially. In FIG. 5A and FIG. 5B, the axial movement of the feedback device 204 is illustrated by arrow C for sake of clarity. It should however be understood that the feedback device 204 moves axially in both directions (i.e. in the direction of arrow C and in the direction opposite thereto, not shown).

In addition, in one embodiment, the reference feature $502_2$ is configured such that the height $h_2$ is greater than the height of the varying detectable feature $502_1$ at any point along the axial direction. In other words, $h_2$ is greater than $h_1$ at $P_3$, where the heights of the varying detectable feature $502_1$ and the reference feature $502_2$ are maximum. In this manner, at any point along the axial direction, the peak-to-peak voltage amplitude $V_{pk-pk2}$ of the signal pulse generated by passage of the reference feature $502_2$ remains higher than the peak-to-peak voltage amplitude $V_{pk-pk1}$ of the signal pulse generated by passage of the varying detectable feature $502_1$.

In order to determine the axial position of the feedback device 204, the voltage difference ($V_{delta}$) between the two voltage amplitudes $V_{pk-pk2}$ and $V_{pk-pk1}$ may first be computed as:

$$V_{delta} = V_{pk-pk2} - V_{pk-pk1} \tag{1}$$

From equation (1), it can be seen that, in one embodiment, the feedback device 204 being configured such that the peak-to-peak voltage amplitude $V_{pk-pk2}$ remains greater than the peak-to-peak voltage amplitude $V_{pk-pk1}$ may prevent the voltage difference ($V_{delta}$) from being equal to zero at any point along the axial direction (including $P_3$). In turn, this may allow to readily differentiate between the farthest axial position of the feedback device 204 (i.e. the position at $P_3$) and a system malfunction or error.

It should however be understood that, in other embodiments, the feedback device 204 may be configured such that, at point $P_3$, the height $h_1$ of the varying detectable feature $502_1$ is substantially equal to the height $h_2$ of the reference feature $502_2$. In this manner, at $P_3$, the peak-to-peak voltage amplitude $V_{pk-pk2}$ is substantially equal to the peak-to-peak voltage amplitude $V_{pk-pk1}$. However, this would lead to the voltage difference ($V_{delta}$) being substantially equal to zero at $P_3$, resulting in an inability to differentiate between the farthest axial position of the feedback device 204 (i.e. the position at $P_3$) and a malfunction or error.

In one embodiment, as the feedback device 204 translates axially towards reverse (from P3 towards P1), the increasingly smaller height of the varying detectable feature $502_1$ causes the sensor signal to have decreasingly lower voltage amplitude $V_{pk-pk1}$, such that the voltage difference ($V_{delta}$) between voltage the amplitudes $V_{pk-pk2}$ and $V_{pk-pk1}$ is larger. Conversely, as the feedback device 204 translates axially towards fine pitch (from P1 towards P3), the increasingly larger height of the varying detectable feature $502_1$ causes the sensor signal to have increasingly higher voltage amplitude $V_{pk-pk1}$, such that the voltage difference ($V_{delta}$) between the voltage amplitudes $V_{pk-pk2}$ and $V_{pk-pk1}$ is smaller. This can be expressed as:

$$V_{pk-pk2}(\text{Reverse}) - V_{pk-pk1}(\text{Reverse}) > V_{pk-pk2}(\text{Fine Pitch}) - V_{pk-pk1}(\text{Fine Pitch}) \tag{2}$$

The value of $V_{delta}$ illustratively increases or decreases as a function of the relative difference in geometry between the varying detectable feature $502_1$ and the reference feature $502_2$, allowing for the axial position of the feedback device 204 to be identified. The axial position may indeed be determined from a voltage ratio ($V_{ratio}$), e.g. using a look-up table that correlates the voltage ratio ($V_{ratio}$) to the axial position. For instance, the voltage ratio may be input into the look-up table and the axial position output from the look-up table.

In one embodiment, using a voltage ratio (rather than an absolute voltage) computation may provide an improved means of determining the axial position of the feedback device 204 where system variables such as tolerance stack-up do not influence the accuracy. The voltage ratio may be computed as:

$$V_{ratio} = V_{delta}/V_{pk-pk2} = (V_{pk-pk2} - V_{pk-pk1})/V_{pk-pk2} \tag{3}$$

or $$V_{ratio} = V_{delta}/(V_{pk-pk1} + V_{pk-pk2}) = (V_{pk-pk2} - V_{pk-pk1})/(V_{pk-pk1} + V_{pk-pk2}) \tag{4}$$

Equation (3) may be used in cases where the difference in voltage amplitude ($V_{delta}$) is linear while equation (4) may be used when the difference in voltage amplitude ($V_{delta}$) is non-linear.

Since the voltage ratio ($V_{ratio}$) changes across the axial position of the feedback device 204, the voltage ratio represents the axial position.

Figure 8:
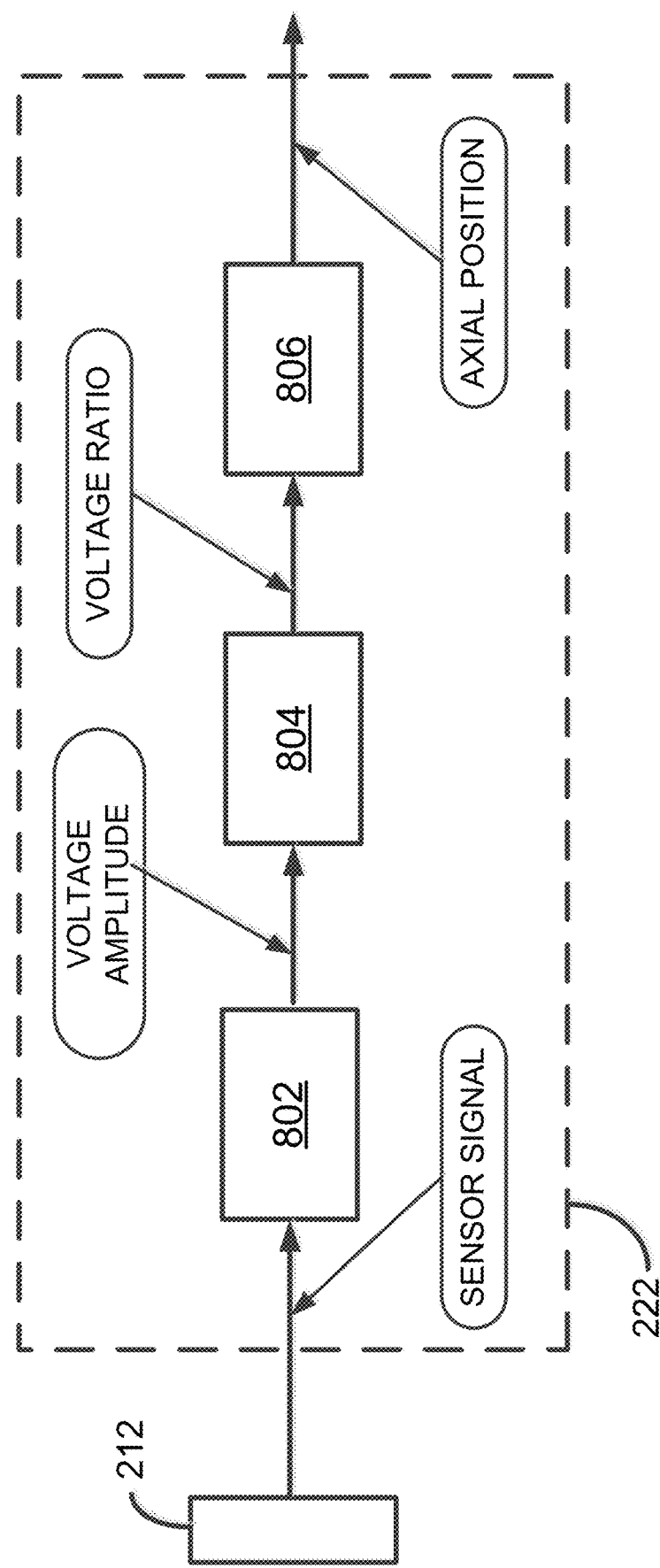
FIG. 8 is a block diagram of an example measuring circuit, in accordance with another embodiment.

Referring to FIG. 8, there is illustrated an example embodiment for the measuring circuit 222. The sensor signal is received by the measuring circuit 222 from the sensor 212. A voltage amplitude detection unit 802 receives the sensor signal and determines the voltage amplitudes of the first and second signal pulses. As discussed above, the voltage amplitude of the signal pulses may be represented as a peak to voltage peak amplitude (e.g., $V_{pk-pk}$) or as an average voltage amplitude (e.g., $V_{rms}$). In some embodiments, the voltage amplitude detection unit 802 is a rectifier circuit, which may be a full wave or a half wave rectifier, depending on the geometry of the feedback device 204. Alternatively, the voltage amplitude detection unit 802 is implemented in software, for example using a peak detection algorithm. Other circuits and/or algorithms may be used to obtain the voltage amplitude of the sensor signal.

The output of the voltage amplitude detection unit 802 (i.e. the voltage amplitudes of the first and second signal pulses) is then sent to a voltage ratio computation unit 804, which computes the voltage ratio using equation (3) or (4) above. The voltage ratio may then be input to a look-up table 806 in order to determine axial position. It should be understood that the look-up table 806 may be replaced with software to apply known relationships/correlations from the voltage ratio to the axial position via equations. The relationships/correlations may be represented by linear or non-linear equations. Interpolation can be used to determine values that fall in between look-up table values.

Figure 9:
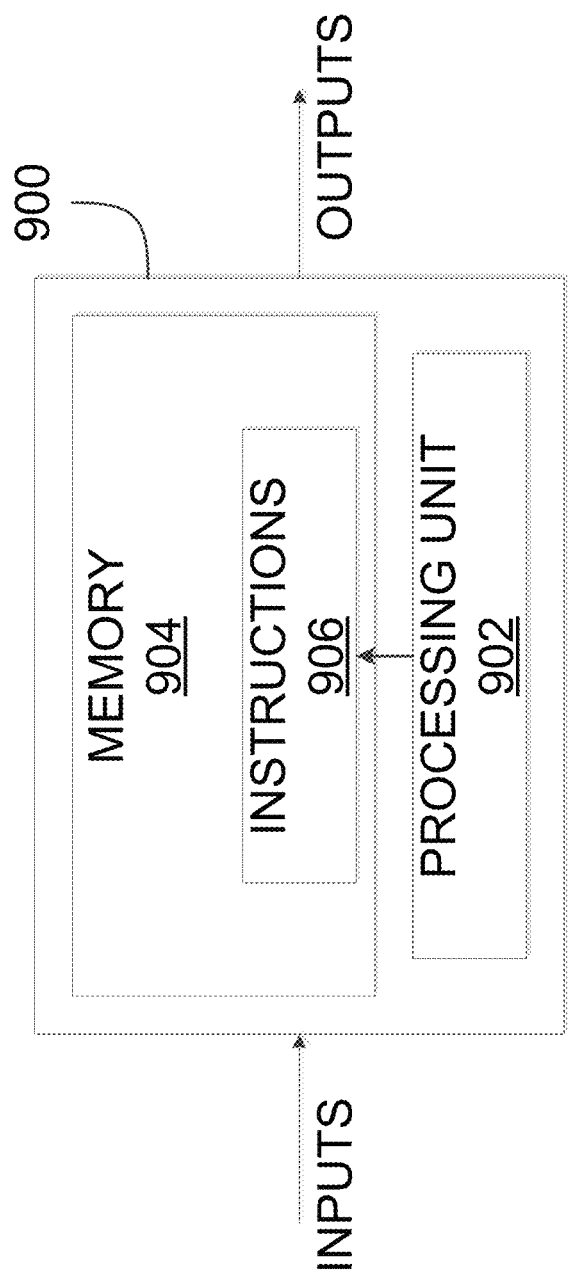
FIG. 9 is a block diagram of an example computing device, in accordance with an embodiment.

FIG. 9 is an example embodiment of a computing device 900 for implementing the control unit 220, and more particularly for performing some or all of the functions of the measuring circuit 222, described above with reference to FIG. 2. The measuring circuit 222, or any other device configured for measuring the axial position of a feedback device as described herein, may be implemented with one or more computing devices 900. For example, a first computing device 900 may be used to implement the voltage amplitude detection unit 802 and a second computing device 900 may be used to implement the voltage ratio computation unit 804. Alternatively, a single computing device may be used to implement both the voltage amplitude detection unit 802 and the voltage ratio computation unit 804. Other embodiments may also apply.

The computing device 900 may form part or all of a Full Authority Digital Engine Control (FADEC), Electronic Engine Control (EEC), Engine Control Unit (ECU), electronic propeller control (EPEC), propeller control unit (PCU), and the like.

The computing device 900 comprises a processing unit 902 and a memory 904 which has stored therein computer-executable instructions 906. The processing unit 902 may comprise any suitable devices configured to cause a series of steps to be performed such that instructions 906, when executed by the computing device 900 or other programmable apparatus, may cause the functions/acts/steps specified in the method described herein to be executed. The processing unit 902 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 904 may comprise any suitable known or other machine-readable storage medium. The memory 904 may comprise non-transitory computer readable storage medium, for example, but not limited to, an electronic, magnetic, optical, electromagnetic, infrared, or semiconductor system, apparatus, or device, or any suitable combination of the foregoing. The memory 904 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 904 may comprise any storage means (e.g., devices) suitable for retrievably storing machine-readable instructions 906 executable by processing unit 902.

Figure 10:
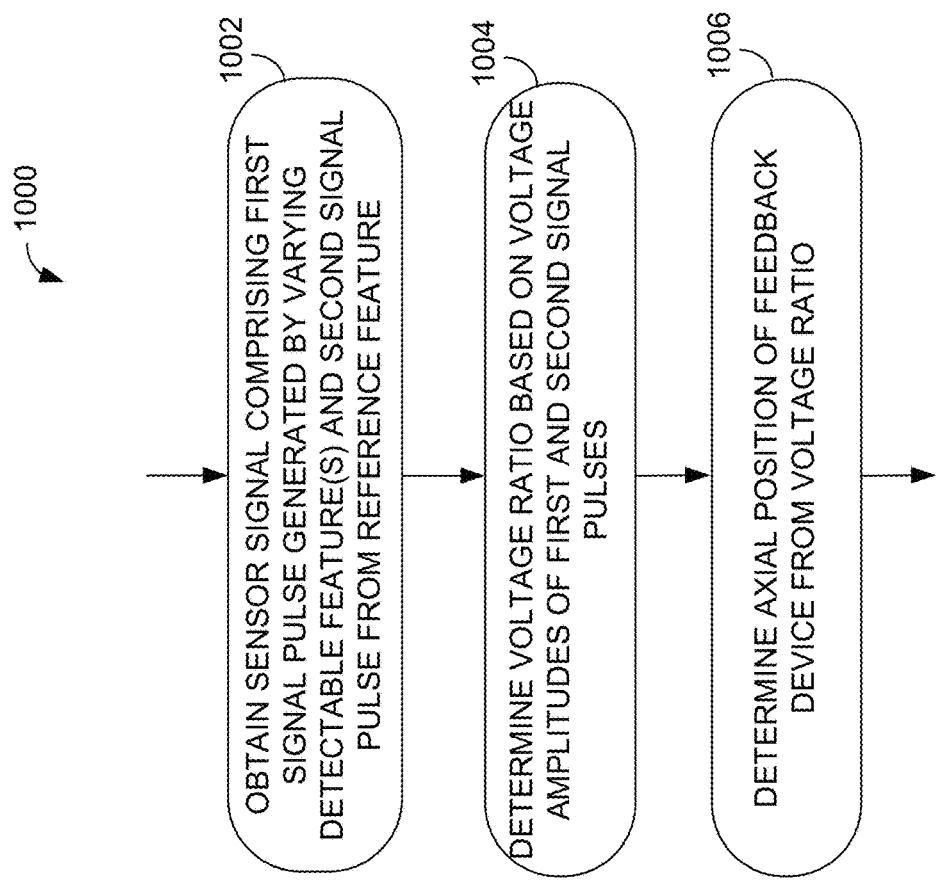
FIG. 10 is a flowchart of a method for determining an axial position of a feedback device, in accordance with another embodiment.

FIG. 10 illustrates a method 1000 for measuring an axial position of a feedback device, as implemented by the measuring circuit 222, for example in part or in whole by the computing device 900. At step 1002, the sensor signal is received. As indicated above, the feedback device 204 comprises one or more varying detectable features (provided by varying the geometry or magnetic permeability of one or more position markers 202) that cause a change in a voltage amplitude of the sensor signal as a function of a relative axial position between the sensor and the varying detectable feature(s). The feedback device 204 also comprises a reference feature that result in the sensor signal's voltage amplitude remaining substantially constant upon the sensor 212 detecting passage of the reference feature.

At step 1004, a sensor signal comprising a first signal pulse generated by the varying detectable feature(s) and a second signal pulse generated by the reference feature is obtained. A voltage ratio is then determined at step 1006, based on the voltage amplitudes of the first and second signal pulses. For this purpose, equations (1) and (3) or (1) and (4) above may be used, depending on whether the difference in voltage amplitude is linear or non-linear. At step 1008, the axial position of the feedback device may then be determined from the voltage ratio (e.g., using a look-up table as described above).

The methods and systems described herein may be implemented in a high level procedural or object oriented programming or scripting language, or a combination thereof, to communicate with or assist in the operation of a computer system, for example the computing device 900. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 902 of the computing device 900, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A position detection method for a feedback device, the feedback device providing feedback on a blade angle of rotor blades of a rotor of an aircraft engine, the method comprising:

obtaining, from at least one sensor, a sensor signal in response to the at least one sensor detecting a relative movement between the feedback device and the at least one sensor, the sensor signal comprising a first signal pulse having a first voltage amplitude and a second signal pulse having a second voltage amplitude greater than or substantially equal to the first voltage amplitude, the feedback device comprising at least one varying detectable feature configured to generate the first signal pulse and a reference feature configured to generate the second signal pulse, the at least one varying detectable feature configured to cause a change in the first voltage amplitude as a function of an axial position of the feedback device relative to the at least one sensor;

determining a voltage ratio based on the first voltage amplitude and the second voltage amplitude; and determining the axial position of the feedback device relative to the at least one sensor from the voltage ratio.

2. The method of claim 1, wherein the second signal pulse is generated by the reference feature being configured to cause the second voltage amplitude to remain substantially constant regardless of the axial position of the feedback device relative to the at least one sensor.

3. The method of claim 1, further comprising determining a difference between the second voltage amplitude and the first voltage amplitude, the voltage ratio determined based on the difference in voltage amplitude.

4. The method of claim 3, wherein the difference in voltage amplitude is determined as:

Vdelta=Vpk-pk2−Vpk-pk1, and further wherein the voltage ratio is determined as:

Vratio=Vdelta/Vpk-pk2=(Vpk-pk2−Vpk-pk1)/Vpk-pk2, where Vdelta is the difference in voltage amplitude, Vpk-pk2 is the second voltage amplitude, Vpk-pk1 is the first voltage amplitude, and Vratio is the voltage ratio.

5. The method of claim 3, wherein the difference in voltage amplitude is determined as:

Vdelta=Vpk-pk2−Vpk-pk1, and further wherein the voltage ratio is determined as:

Vratio=Vdelta/(Vpk-pk1+Vpk-pk2)=(Vpk-pk2−Vpk-pk1)/(Vpk-pk1+Vpk-pk2), where Vdelta is the difference in voltage amplitude, Vpk-pk2 is the second voltage amplitude, Vpk-pk1 is the first voltage amplitude, and Vratio is the voltage ratio.

6. The method of claim 1, wherein the first signal pulse is generated by the at least one varying detectable feature comprising at least one position marker having varying magnetic permeability.

7. The method of claim 1, wherein the first signal pulse is generated by the at least one varying detectable feature comprising at least one position marker having an axially varying dimension configured for causing the change in the first voltage amplitude as a function of the axial position of the feedback device relative to the at least one sensor.

8. The method of claim 7, wherein the first signal pulse is generated by the at least one varying detectable feature having a height smaller than a height of the reference feature for causing the second voltage amplitude to be greater than the first voltage amplitude.

9. The method of claim 1, wherein determining the axial position of the feedback device relative to the at least one sensor from the voltage ratio comprises inputting the voltage ratio into a look-up table and outputting the axial position from the look-up table.

10. A position detection system for a feedback device, the feedback device providing feedback on a blade angle of rotor blades of a rotor of an aircraft engine, the system comprising:

at least one varying detectable feature and a reference feature provided on the feedback device;

at least one sensor configured for generating a sensor signal in response to the at least one sensor detecting a relative movement between the feedback device and the at least one sensor, the sensor signal comprising a first signal pulse having a first voltage amplitude and a second signal pulse having a second voltage amplitude greater than or substantially equal to the first voltage amplitude, the first signal pulse generated upon the at least one sensor detecting a movement of the at least one varying detectable feature relative to the at least one sensor and the second signal pulse generated upon the at least one sensor detecting a movement of the reference feature relative to the at least one sensor, the at least one varying detectable feature configured to cause a change in the first voltage amplitude as a function of an axial position of the feedback device relative to the at least one sensor; and a measuring circuit coupled to the at least one sensor and configured for:

obtaining the sensor signal from the at least one sensor, determining a voltage ratio based on the first voltage amplitude and the second voltage amplitude, and determining the axial position of the feedback device relative to the at least one sensor from the voltage ratio.

11. The system of claim 10, wherein the reference feature is configured to cause the second voltage amplitude to remain substantially constant regardless of the axial position of the feedback device relative to the at least one sensor.

12. The system of claim 10, wherein the measuring circuit is further configured for determining a difference between the second voltage amplitude and the first voltage amplitude, and for determining the voltage ratio based on the difference in voltage amplitude.

13. The system of claim 12, wherein the measuring circuit is configured for determining the difference in voltage amplitude as:

Vdelta=Vpk-pk2−Vpk-pk1, and further wherein the measuring circuit is configured for determining the voltage ratio as:

Vratio=Vdelta/Vpk-pk2=(Vpk-pk2−Vpk-pk1)/Vpk-pk2, where Vdelta is the difference in voltage amplitude, Vpk-pk2 is the second voltage amplitude, Vpk-pk1 is the first voltage amplitude, and Vratio is the voltage ratio.

14. The system of claim 12, wherein the measuring circuit is configured for determining the difference in voltage amplitude as:

Vdelta=Vpk-pk2−Vpk-pk1, and further wherein the measuring circuit is configured for determining the voltage ratio as:

Vratio=Vdelta/(Vpk-pk1+Vpk-pk2)=(Vpk-pk2−Vpk-pk1)/(Vpk-pk1+Vpk-pk2), where Vdelta is the difference in voltage amplitude, Vpk-pk2 is the second voltage amplitude, Vpk-pk1 is the first voltage amplitude, and Vratio is the voltage ratio.

15. The system of claim 10, wherein the at least one varying detectable feature comprises at least one position marker having varying magnetic permeability.

16. The system of claim 10, wherein the at least one varying detectable feature comprises at least one position marker having an axially varying height for causing the change in the first voltage amplitude as a function of the axial position of the feedback device relative to the at least one sensor.

17. The system of claim 10, wherein the at least one varying detectable feature comprises at least one position marker having an axially varying width for causing the change in the first voltage amplitude as a function of the axial position of the feedback device relative to the at least one sensor.

18. The system of claim 10, wherein the at least one varying detectable feature and the reference feature are provided on a same position marker of the feedback device.

19. The system of claim 10, wherein the at least one varying detectable feature is provided on a first position marker of the feedback device and the reference feature is provided on a second position marker of the feedback device, the first and the second position marker circumferentially spaced about a surface of the feedback device.

20. The system of claim 10, wherein the feedback device is coupled to rotate with the rotor about an axis and to move along the axis with adjustment of the blade angle of the rotor blades.

* * * * *